United States Patent [19]

Thibadeau et al.

[11] Patent Number: 5,432,542
[45] Date of Patent: Jul. 11, 1995

[54] TELEVISION RECEIVER LOCATION IDENTIFICATION

[75] Inventors: Robert Thibadeau; Joseph M. Newcomer; David Touretzky, all of Pittsburgh, Pa.

[73] Assignee: Television Computer, Inc., Pittsburgh, Pa.

[21] Appl. No.: 937,641

[22] Filed: Aug. 31, 1992

[51] Int. Cl.6 .............................................. H04N 7/16
[52] U.S. Cl. ......................................... 348/6; 348/9; 455/4.2
[58] Field of Search ................... 348/9, 8, 6, 460, 461, 348/465, 473, 478, 1, 2; H04N 7/16; 358/86, 85, 84; 455/4.1, 4.2, 5.1, 6.1

[56] References Cited

U.S. PATENT DOCUMENTS

| | | | |
|---|---|---|---|
| 3,993,955 | 11/1976 | Belcher et al. | 325/308 |
| 4,155,042 | 5/1979 | Permut et al. | 348/9 |
| 4,323,921 | 4/1982 | Guillou | 358/114 |
| 4,450,477 | 5/1984 | Lovett | 358/86 |
| 4,600,921 | 7/1986 | Thomas | 348/6 |
| 4,602,279 | 7/1986 | Freeman | 348/473 |
| 4,677,686 | 6/1987 | Hustig et al. | 455/5 |
| 4,829,372 | 5/1989 | McCalley et al. | 358/86 |
| 4,868,866 | 9/1989 | Williams, Jr. | 380/49 |
| 5,036,537 | 7/1991 | Jeffers | 348/1 |
| 5,070,404 | 12/1991 | Bullock et al. | 358/142 |
| 5,155,591 | 10/1992 | Wachob | 348/9 |
| 5,260,778 | 11/1993 | Kauffman et al. | 348/9 |

Primary Examiner—James J. Groody
Assistant Examiner—Chris Grant
Attorney, Agent, or Firm—Eckert Seamans Cherin & Mellott

[57] ABSTRACT

Location specific messages or programming are generally broadcast and selectively filtered by user terminals which have encoded one or more arbitrary locations of interest. The area surrounding a user, a remote location, a route to be travelled or the like may be selected for receipt of local warnings, local commercial messages and the like. Transmitted messages contain information targeted to geographical groups of users, with location designation coding accompanying location-specific messages. A geographic location selection code is entered into a data processor coupled to the user's receiver to define the user's selected location(s) of interest. The processor receives the information segment and its designation code and compares the designated location to the selected one. Segments where the designated and selected points or areas overlap are processed, e.g., being displayed, stored or used to trigger a warning. The user's selection code is variable and plural locations can be used and prioritized. Preferably, regions are encoded by their boundaries, e.g., in longitude, latitude, altitude or the like, and in absolute or relative coordinates, and shorthand designations can refer to stored definitions of areas. Filtering segments based on message content, prioritizing the messages and additional features can be included. The system is especially useful for distributing local commercial messages, hazard warnings or the like.

44 Claims, 6 Drawing Sheets

TELEVISION RECEIVER LOCATION IDENTIFICATION

BACKGROUND OF THE INVENTION

1. Field of the invention

This invention relates to encoding an identification of a receiving unit associated with a television, radio or other receiver, or terminal coupled to an information distribution network, to enable the receiver or terminal to select desired data from a generally broadcast stream of information and/or programming. This form of receiver or terminal may include a data processor incorporated in a receiver for showing audio and/or video information, or may be a separate unit, the typical application being a separate set top interface unit which is coupled between the source of a television broadcast signal (e.g., via cable) and a television for displaying the video and audio information on a selected channel.

2. Prior Art

In the past, a set-top unit was rendered distinct from other set-top units coupled to a distribution network, if it was distinct at all, by a unique serial number ("unique ID"), such as discussed for example in U.S. Pat. No. 5,070,404—Bullock et al, by assignment of a unique frequency or other dedicated channel means, as discussed for example in U.S. Pat. No. 4,450,477—Lovett, or by another aspect which allows the set-top unit to process information directed to it and to ignore information directed to other set-top units on the distribution network. Alternatively, the set-top unit could be provided with decryption means which was lacking in other units, thereby distinguishing at least a subset of set-top units such as subscribers to a premium cable channel or the like. This uniqueness of the set-top unit allowed for services such as pay-for-play, subscription services, and digital information subscriptions to be directed by unique ID, frequency, and the like to the paying subscribers, while other subscribers who declined such services could remain coupled to the network but could not process the respective signal.

However, if services need to distributed according to a class of subscribers other than those addressed by their unique identifiers, channels or hardware, it is not readily possible to distinguish among the set-top units such that some can decode the broadcast and others ignore it. For example, there is no way to use pre-ordained distinctions of this type as a means to direct broadcast messages to classes of subscribers based on selected locations, unless the locations are cross referenced to the unique identifier or the like, which is cumbersome. For information services, video messages and various other uses, it would be desirable to allow a user of a set-top unit to filter information from the service based upon proximity of the user to the service, or based on the user's selection of a location which may be or may include an area remote from the unit, which otherwise is of interest to the user. Examples of other locations of interest could include, for example, a place of business, a travel destination or route, the location of a loved one, or other location.

The present invention provides a means for identifying a television receiver or the like based on location, and also for encoding other location information, whereby generally broadcast messages or programming can be filtered and processed by only the users having an interest in the information due to proximity. In this respect, the encoding of information applies both to location specific digital information contained in the broadcast, and location selection information which is preferably input to the system by the user, including but not limited to the location of the receiver itself.

Transmission of digital information over existing carriers as a supplement to conventional broadcasting has been available for many years. Examples are such systems as TeleText and closed captioning. These systems all use custom decoders to make a limited amount of specific information available to users having a custom decoder. The information is broadcast to all receivers, but only the subscribers can use it. Typically the amount of data transmitted is limited by the fact that the digital information is embedded in a single channel with the general broadcast. For example, TeleText and closed captioning are typically encoded during the vertical retrace period of the video signal. A single line of text characters, or at most a screen of text characters, are stored and displayed.

Alternative methods for limiting access to information and/or the ability to process the information include the use of entitlement messages (e.g., U.S. Pat. No. 4,868,866—Williams), unique message identification (U.S. Pat. No. 4,829,372—McCalley), frequency multiplexing (U.S. Pat. Nos. 4,677,686—Hustig and 4,450,477—Lovett), and encryption (U.S. Pat. No. 4,323,921—Guillou). Although these devices permit selection of a subset of users who can use a generally broadcast message, their application to filtering information based upon arbitrary locations or ranges of locations are limited due to the need to define locations and to convert such information into the very different methods by which the users are rendered distinct from one another.

Limitations of the prior art techniques for distinguishing users with respect to selected locations or proximities are inherent in the type of distinguishing techniques used. For example, when entitlement messages are used, an entitlement message for every receiver must be transmitted at least once before the message, thus requiring considerable bandwidth to enable receipt of public safety and information broadcasts which are to be sent to a large group of users. Unique message identification requires transmission of multiple copies of the same information, each copy possessing a unique ID or addressing code for decoding by one user. Frequency multiplexing requires modulation and broadcast of information on multiple channel frequencies, which is useful for distinguishing relatively large groups but cannot be applied practically to distinguish users down to useful differences in location, even assuming that local multiplexing and frequency conversion equipment is provided to accomplish the encoding. Encryption also requires either broadcasting multiple copies of the same information encrypted with the various keys possessed by the receivers, or addressed broadcasting of new encryption keys to individual users every time a different subset of users is to be selected. Moreover, known location distinctions are limited to the location of the receiver and are inapplicable to arbitrary ranges of proximity, selection via a plurality of geographic locations and/or areas of interest, and the like, which would enable generally broadcast information to be filtered for geographically pertinent information.

It is known to attempt to activate receivers in the event of an emergency broadcast (e.g., U.S. Pat. No. 3,993,955—Belcher). However, such systems provide no selectivity based upon the location of the receiver, which is activated in a general broadcast mode. It is also known to attempt to limit processing of information to particular subscribers having a certain zip code or state code (e.g., U.S. Pat. No. 5,070,404—Bullock et al). However, these invariable geographic definitions lack the versatility of arbitrarily defined areas, and the specificity of more localized location identifications that could render an information distribution system useful for local commercial offers and the like.

Providing for selective broadcast using any of the methods of frequency multiplexing, encryption, message identification and the like, requires that the broadcaster maintain a catalog of all of the relevant receiver frequencies, encryption codes, or unique IDs. This catalog is limited to the location of the receiver. An inaccurate catalog can result in customer dissatisfaction with respect to general services at a minimum. When public safety information is broadcast, omission of customers can result in personal injury, property loss, or even fatalities. In addition to social responsibility issues, the broadcaster who attempts to define a subset of specific users at risk may provide a false sense of security. On the other hand, a set-top unit that can determine its own location (by a variety of methods) or can respond to a designation of arbitrary locations, immediately and accurately receives the geographically targeted information which the user requires.

According to the present invention, a processor is coupled between a receiver operable to display, record or play back information, and monitors digital information encoding location identifiers in a general broadcast signal. This arrangement allows the generally broadcast information to be filtered for locations in a variety of ways, and these ways preferably are embodied in applications routines to which users have access. There is currently no system capable of selectively providing user services based on user definable geographic locations in the manner discussed herein.

SUMMARY OF THE INVENTION

It is an object of the invention to enable identification of receivers to selectively process generally broadcast data or programming, by means of encoding arbitrary position information respecting one or both of the content of the generally broadcast information and the area of interest of a user of the receiver. In this context, a "receiver" is construed to include a variety of tuner-equipped devices such as television receivers, VCRs, cable interface boxes and the like, whereby a signal is selected.

According to a preferred embodiment, a set-top receiver such as a cable interface device or the like includes a processor, or at least a comparator, which is encoded at least with its own geographic location, e.g., via latitude, longitude, and preferably altitude. The receiver is coupled to an input means enabling the location to be changed and stored in a memory coupled thereto. The input means can include switch means operable by the user. This information can be rendered accurate to a few meters. The position of the receiver, and presumably the user thereof, is used by the associated digital information processor to determine the relevance of generally broadcast information which it receives. This information preferably includes digital information and may include, for example, offers of commercial services that are location specific, public or legal notices targeted to a specific area, public safety and emergency information notices, and many other forms of information which the end user may wish to examine. Similar information which applies to locations in which the user is not interested can be ignored by the processor.

To a large extent, position information is applied to a certain area by encoding and/or calculating X and Y borderlines in one or more polygons defining an area of interest. According to the invention, normal spatial coordinates such as latitude and longitude are preferably extended to include altitude. This is of particular interest for concerns such as emergency weather information because flood warnings, icing conditions and rain/snow boundaries are often related to altitude. For example, a flood warning may be of grave importance to a user at a low elevation adjacent to a river or other watercourse, but may be of less importance to someone whose latitude/longitude coordinates are even closer to the watercourse, but whose elevation precludes any danger under the circumstances.

The geographic position and altitude of the area (or volume) of interest can be defined more or less specifically, depending on the information which is being sifted by the data processor. For many types of messages, a general area designation may suffice. Preferably, however, the geographic definition can be made quite specific, which renders the invention useful for information which may apply for a limited area such as a neighborhood, a city block, or even a particular residence. Furthermore, the user is not limited to an area of interest definition which includes the location of the receiver, and additionally can select information at a range of distances from the receiver, at a location remote from the receiver, along a route between arbitrary points, and the like.

The invention overcomes problems with known receiver selection or access controlling systems to enable a wide variety of uses of broadcast information which is most usefully interpreted by its geographical relevance to the subscriber. It is possible according to the invention to selectively target geographical areas with messages relevant to that area without requiring complex time or frequency multiplexing. The end users have control of the geographic definition and can arrange to see, store or otherwise process only messages relevant to selected geographic areas without having to process messages which are outside their area of interest. Alternatively, the user can choose to process all the messages. The processor can be arranged to control the receiver, to monitor general broadcast information in the background, and then to activate the receiver, switch channels, store information, generate an alarm, or otherwise to alert the user to messages of interest which may appear in the generally broadcast information.

It is an object of the invention to transmit considerable information with a minimum usage of broadcast bandwidth because additional bandwidth is not required to separate messages geographically or to address specific users, for example by unique or semi-unique encoding (e.g., political jurisdiction or subdivision, address, telephone number, zip code, receiver serial number) which must be cross referenced to stored data to determine longitude, latitude and/or altitude information. Nevertheless, such definitions of areas can be included, preferably as alternatives for designating an area of interest.

It is possible to transmit considerable information without use of secondary multiplexing equipment (for example as in U.S. Pat. No. 4,450,477—Lovett) to keep the information separated. A plurality of geographic areas of interest, each being arbitrarily selected by the user, can be designated. The user of the receiver, rather than only the broadcaster, has the ability to define which geographic area or areas are of interest to the user.

Inasmuch as geographic information is the basis of selection, broadcasts which are usefully interpreted by geographic location of the receiver need only be broadcast with their geographic information attached, rather than having to broadcast separately by unique ID or entitlement code to individual receivers known to be located in a given area, or to have to broadcast the same information on a plurality of frequencies simultaneously, or to have to broadcast uniformly to all receivers in a general broadcast.

The set-top unit of the invention can preferably monitor multiple locations for broadcasts, enabling subscribers to monitor information not only for their home, but a plurality of alternate locations, including such locations as their workplace, locations of other family members (for example, to monitor emergency weather information for an elderly family member), routes to be traversed, or simply to monitor breaking news. The set top unit preferably supports multiple regions simultaneously, or a single location, and can respond to different input messages with different priorities as a function of user selections.

Transmission of information to a set-top unit can be by any broadcast method. Presently available methods include, for example, cable, radio broadcast, fiber-optic or other information transmission channels, digital and analog signals, or hybrids of both, private carriers and common carriers, and other broadcast methods. The invention is applicable to U.S. television standards (e.g., NTSC), European or other national or international television standards (e.g., PAL or SECAM), emerging television standards including high-definition TV (HDTV) and digital TV, information media which are not directly coupled to television standards such as computer information networks and displays, and to non-visual transmissions such as audio-only channels.

Encoded programming as well as accompanying digital information can be broadcast wholly or partly on dedicated digital channels, transmitted during the vertical blanking interval of a composite video signal as currently used for TeleText or closed captioning, or otherwise encoded on a subcarrier of a video or audio channel or on another channel operating simultaneously.

According to a preferred arrangement, the geographic filtering of digital data is accomplished by data transmitted over ordinary cable television distribution lines, using the existing cable industry infrastructure.

At least the following classes of services are facilitated using the location identification features of the invention, and additional classes of information should be apparent from this exemplary list:

Public safety services such as hazardous weather alerts, hazardous condition alerts (e.g., chemical spills), and crisis information distribution;

Public information services such as employment services, consumer information services, legislative information services, traffic and transit information services, and health information services;

Commercial information services such as classified advertising, product information and targeted marketing services;

Personal information services such as "want ads" (as exemplified by "situations wanted", "services available", "services needed", "wants-to-sell", "wants-to-buy", "missing pets", and similar uses);

Geographically specific information services, such as neighborhood concern groups, regional political groups, and the like.

According to the invention, information which is broadcast contains location information. This location information is used to filter out messages whose relevance is determined, at the option of the end user, to be of no interest. Alternatively or in addition, the information can be prioritized based upon distance, and displayed, stored or otherwise processed preferentially as a function of priority. One or both of the user and the broadcaster specifies one or more geographic regions by defining polygons and/or points. A data processor associated with the set top unit can define polygons around point, distances from points and the like to automate the geographic definitions and priorities. The intersection of polygons or polygons and points, as determined by the data processor, determines whether particular information is selected or ignored. This allows the user to make decisions based upon considerations of proximity, and appropriately and usefully to select information from a generally broadcast program or data stream. This information normally includes a great deal of information which is of no interest to the user, interspersed with information which is of interest, and by use of the data processor and the encoding procedure discussed herein, useful and desired data is readily and automatically separated from the chaff.

The invention provides a programmable receiver system to use location information embedded in a general broadcast or transmitted in connection with a general broadcast. By encoding and comparing locations and regions of interest, i.e., including not only points of interest but also linear routes, plural points and regions surrounding the points, the processor filters the received information to provide the end user with only the information of interest based on the user's selection of geographic constraints.

BRIEF DESCRIPTION OF THE DRAWINGS

There are shown in the drawings certain exemplary embodiments of the invention as presently preferred. It should be understood that these embodiments are examples only, and are subject to variations in accordance with the scope of the invention defined by the appended claims. In the drawings.

DETAILED DESCRIPTION OF THE PREFERRED EMBODIMENTS

Figure 1:
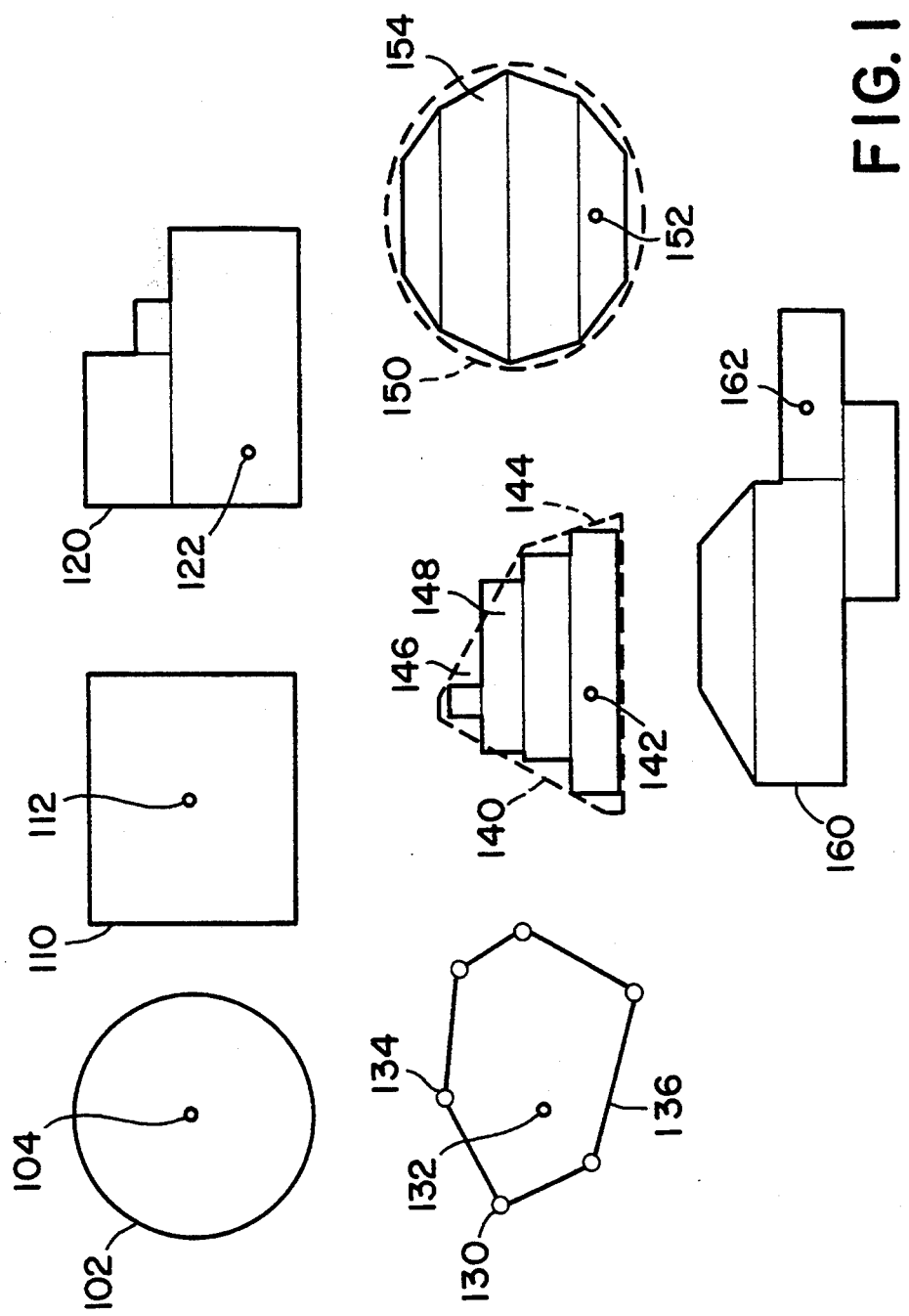
FIG. 1 is a graphic illustration showing a variety of techniques in which an area of interest is defined according to the invention, surrounding one or more designated geographic points.

Any means of transmitting data along a channel may constitute an acceptable delivery mechanism for information. This includes, for example, fiber optic cable, telephony or other point-to-point transmission, coaxial, twisted-pair, or other cabling point-to-point or broadcast, microwave, UHF, or direct satellite reception. Existing LAN and WAN transmission, including concepts such as using unused network capacity to broadcast such data in the background over any existing network, also apply. While all of these are applicable to the invention, a particularly advantageous application is by use of existing cable TV and so called "wireless cable" TV. These systems are in place, provide multi-channel distribution capability, and sufficient bandwidth to transmit a great deal of information in video, audio and digital form.

According to a currently preferred method, geographic information is encoded to define a geometric property, which may have two or more dimensions, generally designated herein as a "region". At a minimum, the region has no extension in any dimension, being a single point. This point designation can be employed to designate, for example, the location of a provider of goods or services in a commercial ("classified ad") broadcast. Other regions may be represented by a simple closed geometric shape (such as a point and a radius to define a circular region, such as a region in which a merchant may provide free delivery services), or an arbitrary region comprised of the union of a set of shapes, such as rectangles, circles, trapezoids, or other polygons, or combinations such as chords or segments thereof.

At least some region information is encoded both by the transmitter of information and by the receiver itself. The transmitted geographic information can be provided in a header preceding a data packet or other unit of transmission, in a catalog of transmission units to follow, in a second channel transmitted at substantially the same time as the information to which it refers or at another location, time or representation, or provided encoded in some other transmission.

When the geographic information of the message is a single point or a small region, its relevance is determined by whether or not its geometric intersection with designated regions of interest of the receiver is a non-empty region. When the geographic information of the message is a large region (such as a section of a city), its relevance may be determined by whether or not the point representing the set-top location is contained in the region. Preferably, both techniques are made available, such that the transmitting party and the user can alternatively define points and areas by grid positions or by an applicable artificial coding such as a postal code (e.g., zip code), political jurisdiction (e.g., city, county, state), telephone exchange, street, block, subdivision or similar informal geographic indicator, or the like. Typically, the artificial coding consumes fewer bits than a precise geographical definition, although it may be longer, yet useful for convenience. These alternatives can be cross referenced in the set-top data processor or in the transmission, such that the artificial encoding is convertible into a polygon or set of polygons which will be tested for intersection with the location information contained in the other of the data processor and the transmission.

When a message has a non-empty intersection with a region of interest, the message is said to be of "interest". One can refer to the set top unit as "noticing" the messages of interest if it chooses to react to them or "ignoring" messages which are not of interest. Messages which are not of interest preferably are not processed beyond the extent required to determine their interest, although it is also possible that such messages simply could be processed differently than those of interest, for example stored but not acted upon.

FIG. 1 illustrates a two dimensional coordinate system based on latitude and longitude. A three dimension or other multi-dimensional application of these techniques is also possible, i.e., using altitude as a further limiter, in which case the region is actually a volume. In FIG. 1, the circle 102 is the locus of points equidistant from a point in two of the dimensions, for example the location of the set top unit 104 in an X-Y coordinate system. An alternative representation of a region of interest is the rectangle 110, where the set top unit is in the geometric center of the square at 112.

The foregoing suggests that a "point" is dimensionless, i.e., the intersection of precisely defined mutually perpendicular lines. A less specific representation of a point or region can be used, e.g., by defining a set of squares or rectangles wherein the minimum unit is considered to be a point even though it actually encompasses a discrete area. The additional generalization is that the locus or precise point can be anywhere in the closed polygon, such as in polygon 120, containing the precise set top location 122.

A region such as region 130 may be defined by a set of points surrounding the set top location 132, where the points, one of which is shown as point 134, define a set of edges 136.

Non-rectangular regions may also be approximated by rectangles, such as region 140, which surrounds the set top location 142. Rectangles 146 and 148 illustrate two mechanisms of approximation. In the drawings, rectangle 146 is fully enclosed by the region 140 to be approximated, and rectangle 148 is not. Depending upon whether the user (or transmitter) wishes to err by omission of marginal edges or by inclusion of excess area around the region 140, either method can be used.

It should be noted that a closed polygon is not strictly required to designate an area. It is also possible to define an area as being anywhere to one side of a line or to selected sides of two lines, etc. For example, marine and land-relevant information could be distinguished by defining a line corresponding to the coast, and determining on which side of the line a point or region falls.

Preferably, the system is capable of distinguishing locations to a degree which is useful in connection with the information being transmitted, and the specificity of this information can be variable. For locally active commercial business messages, a minimum unit may be a small as a block or even as small as a residence. By encoding longitude and latitude to a tenth of a degree of arc (which is a resolution used by GPS, LORAN (Long Distance Radio Navigation System) and the like), it is possible to encode a point anywhere in the world using as few as 48 bits, to a resolution of ten feet by ten feet (at the equator).

It is useful to include the ability to encode irregular geometric shapes. The use of trapezoidal subregions for this purpose reduces the error without increasing the number of subregions required to define a region. The circular region designated 150 which surrounds the set top location 152 can be closely approximated with a small number of trapezoids, exemplified by the trapezoid designated 154. Furthermore, if the trapezoid or other polygon is defined by the number of apices, the same number of bits is needed whether the definition is square or trapezoidal.

This method for defining areas, locations and/or multi-dimensional volumes is not limited to convex polygons. Referring again to FIG. 1, polygonal region 160 surrounding location 162 consists of several subregions, which in this example includes both rectangular and trapezoidal subregions.

Figure 2:
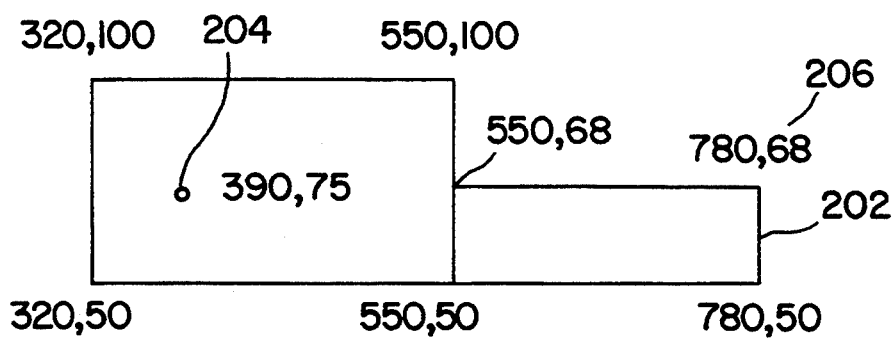
FIG. 2 is a graphic illustration of an alternative embodiment relying on absolute and relative coordinates.
Figure 2:
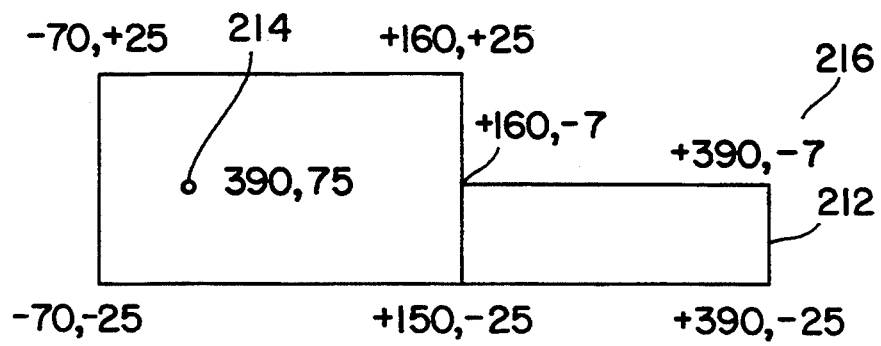

FIG. 2 illustrates the application of absolute and relative coordinates. Preferably, the processor associated with the set-top unit includes the ability to convert between absolute and relative positions in determining the intersection or non-intersection of defined points and/or regions. Region 202 contains an absolutely defined location 204 having an X coordinate and a Y coordinate. For example, the coordinates of a point, as exemplified by coordinate 206, are in the absolute coordinates of latitude and longitude. For simplicity of illustration, additional dimensions, e.g., altitude, are omitted from this drawing.

An absolute coordinate system other than longitude and latitude is also possible, particularly in a regional data transmission network wherein all the users are located within a defined area. The coordinates shown in FIG. 2 are arbitrary integers for the purpose of illustration. Region 212 is identical to region 202. The set location 214 in the region, identified by absolute coordinates, is used to define relative coordinates of the apices of the polygons defining the region of interest. The coordinates relative to the set location, which is arbitrarily assigned 0,0, can be converted readily into absolute coordinates using the absolute coordinates of the point of reference, in this case the location of the set-top unit. However, for purposes of convenience such as in defining a location of interest within a certain distance (e.g., walking distance, where the definition of walking distance might be variable, such as for a marathon runner and a person suffering from arthritis) from the set-top unit, can be processed as relative coordinates 216 and converted back and forth between relative coordinates 216 and absolute coordinates 206. Similarly, one coordinate system can be converted into another using simple calculations of this type.

The data processor associated with the set-top unit receives location information from the transmission and from the user, or perhaps from an application routine which the user employs to define locations of interest, e.g., in response to selections made in a menu or the like presented to the user as a part of the process. Having defined regions and/or points, the data processor compares them in the same coordinate system in order to determine whether the transmission location data and the selection location data intersect.

Figure 3:
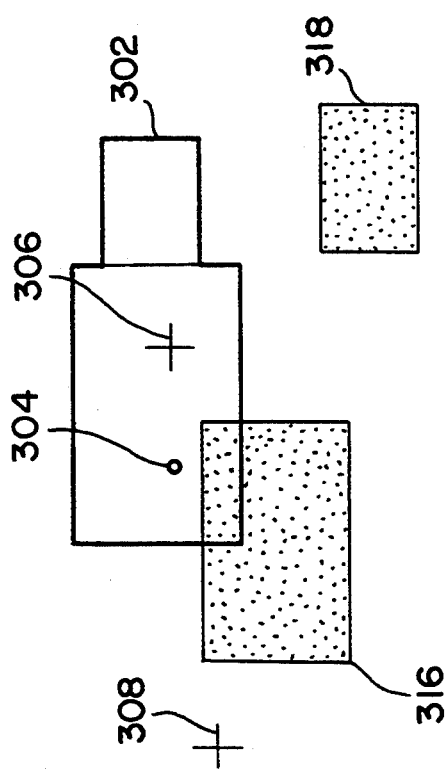
FIG. 3 is an illustration of containment tests undertaken by the processor according to the invention, for determining the intersection or non-intersection of points and/or regions.

FIG. 3 illustrates containment tests for this purpose. Region 302 includes the set top unit location 304. For simplicity of illustration, the third or further dimensions, such as altitude, again are not illustrated. A message may encode a point, such as points 306 or 308, or a region, such as rectangular regions 316 or 318. By a suitable comparison of the polygonal edges of the defined regions using a series of less-than, greater-than comparisons, the data processor can determine an intersection or a lack thereof.

Figure 4:
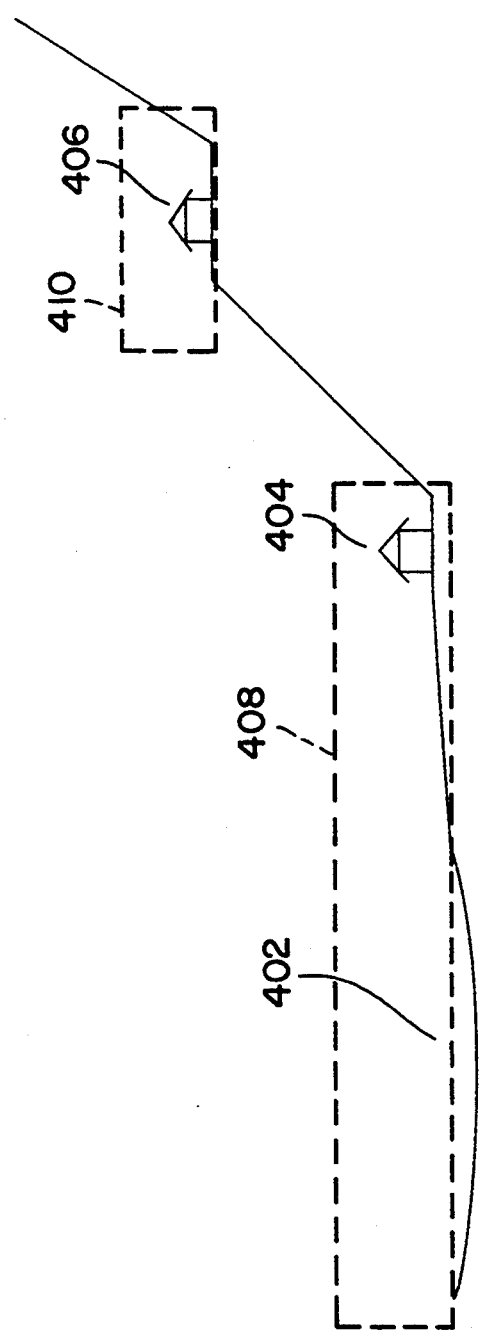
FIG. 4 is a graphic illustration of an alternative embodiment comprising more than two dimensions, in particular illustrating altitude as a further dimension used to define intersecting points and/or volumes.

FIG. 4 illustrates application of the invention to regions including three dimensions. The use of altitude information, for example, is useful to distinguish between locations which may have different exposure to an altitude related environmental parameter. The particular example is for flood warning messages. The river 402 occupies a lowermost location designated 402, and depending upon flooding conditions may occupy a variable X-Y area, depending on the flood stage. Two residences at locations 404 and 406 are quite close in X-Y position but have different elevations. In the side elevation view of FIG. 4, regions 408 and 410 are illustrated by rectangles 408 and 410, which represent a horizontal extension of latitude and/or longitude, and a vertical extension of altitude or elevation. It would also be possible in this situation to use a vertical point (rather than an extension), namely the lowest elevation of the residence at location 404 or 406, to define the vertical point, any information respecting a higher elevation being of interest to the user in connection with a flood warning.

A simple region 102 as shown in FIG. 1 and defined by points within a particular radius of a defined point such as the set top location, is also readily employed by the data processor to compare transmitted and user-selected location information. A typical use of a region such as this would be to locate a set of service providers within a given distance of the receiver (for example, locating all the ice-cream shops within walking distance). In that case, the service providers define their point locations in connection with a transmission, which the data processor compares to the user-selected circular region to determine intersection.

The same considerations operate in the opposite direction. For example, a service provider may define a service zone, which the data processor matches with the user's selected location (e.g., that of the set-top unit) to determine intersection (for example, selecting drywall suppliers who deliver free within a zone including the user's remote construction site at Broad and Main Streets).

The region 110 in FIG. 1 is defined by mutually perpendicular borders at equal distances from the set top location 112. This form of location identification is useful, for example, to define nearby locations based on city blocks (assuming the blocks are in a rectangular grid). Its applicability is the same as region 102.

The set top location need not be centered in the region of interest, as illustrated by region 120 in FIG. 1. The location 122 can be at any arbitrary location within the region, and preferably the user can define a region based on other needs than the need to locate information respecting locations near his or her receiver. An asymmetrical relationship between the receiver location and the borders of the region of interest is appropriate, for example, to define a political area, such as a designated neighborhood. An example of a use of this sort of region might be a pizza delivery service which delivers within a particular neighborhood or the like. The general broadcast information may include a listing or advertisement for any or all the pizza shops within the information distribution area. Instead of wading through listings to find those pizza shops which will deliver to a location, perhaps necessitating querying each shop individually, the user can simply define the location, instruct the data processor to limit information not only by location but also by text (e.g., the string "pizza" and/or "deliver"), and the data processor can sift through the available information for a match. Only those set top units in the respective delivery areas are "interested" in messages from shops that serve them. Thus if region 120 represents a pizza delivery area the set top unit is at location 122 it will "notice" the message about the service.

Selection of information to the specifications of the user can be an interactive process, using repetitively transmitted commercial messages which the data processor monitors upon command for selected location and descriptive information. Alternatively, the processor can include a memory whereby location information triggers storage of information in a database which is updated when new information is received. This database can be searched off line, at the user's convenience. In that case, the location designated information of interest is not necessarily displayed, but is processed differently than information which is not of interest, and normally ignored entirely. In addition to selective processing of data in this manner, the data processor can be alert for information tending to prioritize the information. For example, a severe weather warning can be indicated by an appropriate code or text string, and the data processor can be programmed to generate an alarm, break into programming otherwise being displayed or otherwise to provide an appropriate warning to the user based on the priority of the information received.

A region may also be designated by a set of points, such as region 130 in FIG. 1 surrounding the location 132, located arbitrarily within the region. A set of points, such as points 134, are connected by edges 136, to define the region. In processing this information to determine intersection with another region or point, the processor defines one or more lines intersecting the points and determines whether the point or region lies on one side of the line or the other. Thus the borders of the region can be defined by points, lines, distances from points or lines, and by any other arbitrarily selected designation of a subset of all the area within the potential universe of interest.

Non-rectangular regions may be approximated in a variety of ways. Region 140 in FIG. 1 contains the set top at location 142. Each of the rectangles (e.g., 144) provides an approximation of the outline of a region containing the set top location. Area 146 is within the irregular contours of the area being approximated by rectangles, but in fact is omitted from the defined region. The degree of error decreases as the number of rectangles increase. Where the region can be defined by any number of rectangles or other polygons, and there is no constraint that all rectangles be of identical height, which is a generalization of traditional mathematical methods of approximation, the region can be defined in usefully specific detail. Defining region by rectangles and polygons has the advantage that membership tests are simple, but the bits required to define the area increases with the complexity of the polygon and the desire to minimize the error of the approximation.

It is possible to choose a technique of approximation to ensure either that all the area of interest is included in the defined region (including some erroneous excess), or to ensure that none of the defined region exceeds the area of interest (thus erroneously omitting some of the area of interest). Alternatively, this choice can be made in an alternating manner to provide a general approximation. Whether to use one technique or the other depends on the nature of the message. The rectangle 148 in FIG. 1 encompasses a small area outside the intended region but includes additional space. The alternative technique is embodied by rectangle 146.

Trapezoidal subregions allow complex shapes to be approximated with a smaller degree of error while minimizing the number of actual subregions required. Circle 150 in FIG. 1, enclosing the location 152, is very closely approximated by a small number of trapezoidal regions such as that designated 154. The defined region is made larger or smaller than the actual region by making the trapezoidal edges tangents to the circle or chords, respectively.

The method is not limited to convex polygons or to any particular subregion technique. Region 160 in FIG. 1, containing the set top location 162, consists of several rectangular blocks and a trapezoidal region.

The endpoints or dimensions of such regions or their composite subregions are preferably specified in geographic coordinates, either absolute coordinates or coordinates measured relative to the nominal set-top location. This is illustrated in FIG. 2. Region 202 contains the set top location 204. The coordinates of the region, such as coordinate 206, are expressed in absolute geographic positions. For simplicity of illustration simple integers are shown. In a preferred embodiment, the coordinates are geographic latitude and longitude, and a third dimension is altitude above nominal mean sea level. This would be used in typical applications to designate geographic areas such as specific neighborhoods, political regions (examples being city or county borders), topologically designated areas (examples being an area "near the river" or within a certain contour elevation line and consequently subject to flood warnings, "on the west side of the hill" and perhaps in danger of high winds). It is possible to store shorthand designations or tokens which represent a region having a complex shape, for reference to regions which are of use for particular messages. Relative encodings encode designations such as "within five blocks of my location" or "within a mile of location X,Y", and so forth.

Altitude information can be readily encoded by use of a digital barometer. Normally, a barometer indicates only absolute pressure and cannot be used to determine altitude unless the barometric pressure corrected to a known altitude, such as mean sea level, is also known. However, because of the nature of the broadcast information, the barometric correction can be transmitted as part of the information being processed, and thus the correction can be automatically applied to the absolute barometric pressure to derive an altitude.

The significance of altitude in creating three-dimensional region is to direct information to specific locations which may be geographically proximate in latitude and longitude, but significantly separated vertically. The difference in elevation may have considerable relevance to the messages, such as vertical proximity to a river being relevant to flood alerts.

A message which is received includes its own region information or is transmitted in conjunction with a separate and cross referenced signal representing the region information, for example on a digital channel of a cable distribution network dedicated to such information. Preferably, any information which has a non-empty intersection with the region of interest encoded in the receiver will be considered a message of interest, at least stored for reference by the user, and preferably displayed upon request. A message may encode a single point as its geographic information, or it may encode a region encoded as previously described. Standard geometric intersection algorithms can be used to test for containment or intersection.

The advantage of the use of regions is that messages, particularly safety and public information messages, can be directed to the receivers to which they apply. Examples of the usefulness of the information are readily apparent. For example, assuming that bus service will be re-routed in an area due to construction, a message containing this information can be encoded with a region which represents distances surrounding the area of disruption. Only those set top receivers within the area of concern will "notice" the message as relevant. In addition, another information message can be transmitted which includes the area surrounding the entire bus route, so that riders who may be using the bus will receive this notification. Those riders who use the bus may specify hat they wish to see any public notification messages along their route of travel regarding transportation, by specifying the region of their bus route and/or by entering suitable input commands to cause the data processor to search not only by location but also by keywords.

A preferred embodiment of tests is illustrated in FIG. 3. Region 302 is the region surrounding the set top location 304. A point transmitted in a message is considered of interest if it is within the region, such as point 306. A point is considered to be of no interest if it is outside the region, such as point 308.

The transmitted message includes a region designation. A message is considered to be of interest if the intersection of its region with the chosen region is more than zero. In FIG. 3, this is illustrated by region of interest 302. A region which is defined in the transmitted message, such as region 316, is determined to be of interest because it intersects the region of interest 302. The region designated 318 is determined to not be of interest because it does not intersect the region of interest 302. In this illustration, for the sake of simplicity of illustration, only simple regions are shown and only in two of the possible dimensions of space, time and subject matter.

While it is preferred to transmit a full definition of the respective region with its corresponding message, for complex regions, particularly those designating broad areas such as political units (cities, counties, states, legislative districts, informal districts such as subdivision or the like), it may be more effective to transmit the name, or a suitably encoded representative of the name, to the receiver. The mapping of the names, or their encoded representation, to the actual regions, can be broadcast separately and stored in the set top unit. An example would be to transmit a county name and the region defining it, whereupon later messages intended for county residents transmit only the county name as a shorthand location designation. For this to be successful, repetitive transmission of the mapping and their shorthand codes are needed to guarantee that all set top units contain the mapping.

Figure 5:
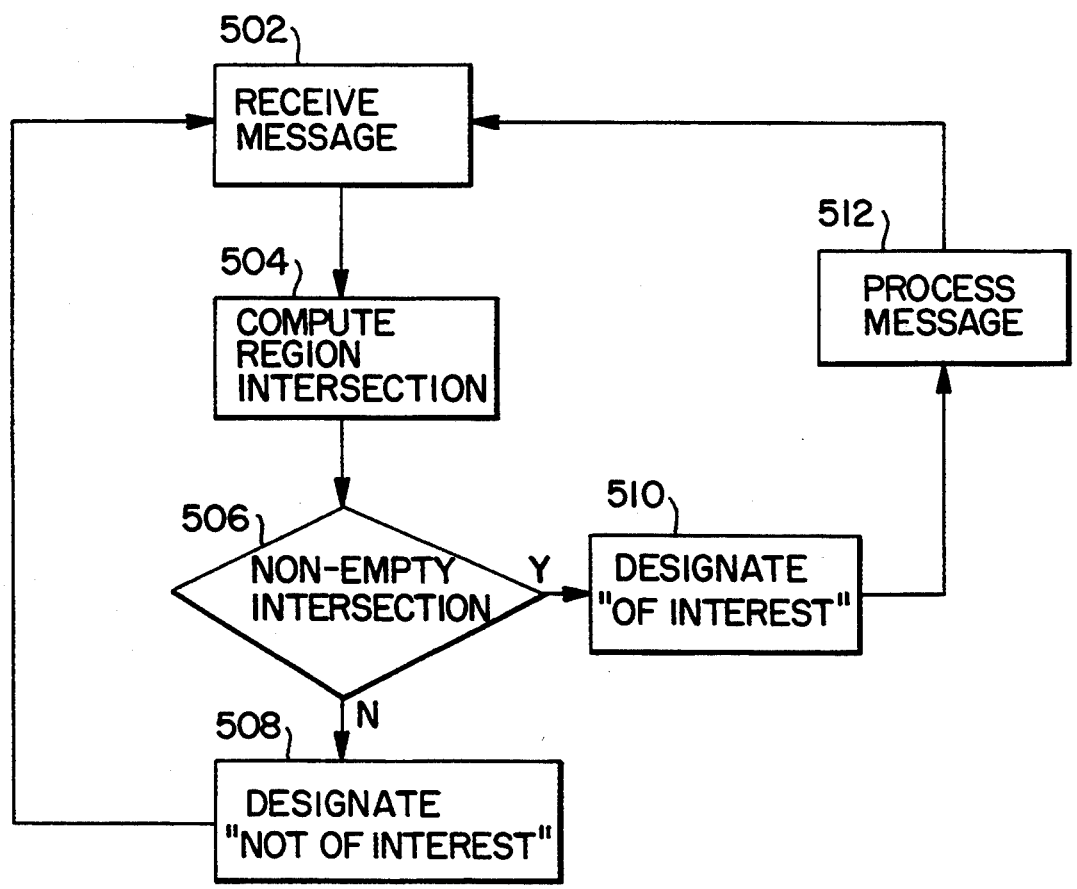
FIG. 5 is a flow chart illustration showing the processing of data according to the invention.

The flow of processing of messages by the data processor is illustrated in FIG. 5. A message is received at block 502 and includes a location designation. The processor has a stored location selection, which can default to a selection based on the location of the receiver, and which can include or be replaced by any arbitrary selection made from user input. The region intersection with the appropriate regions is computed at block 504. Block 506 represents an intersection test: is the intersection of the region of the message with the set top unit's regions of interest non-zero? If the intersection is empty, control flows to block 508, which handles the processing of "non-interesting" messages, typically discarding them. From this point, control returns to the message receipt block 502. If the intersection is non-empty, control passes to block 510, in which the message is designated as "interesting". This will usually involve determining a processing routine to handle that message for storage, display or both. Finally, the message is actually processed at block 512. This processing may encompass a plurality of actions, including but not limited to displaying the message on the screen, either exclusively or as a message-over-video, performing any of a plurality of necessary controls to make the message visible, such as turning the receiver on and/or modifying the receiver's channel or volume settings to display the message, storing the message for later retrieval, directing the message to a plurality of externally connected devices, such as attached personal computers, activating visual, audible or other alarms to notify those in proximity of the message (as would be appropriate, for example, in the event of a tornado alert or flash flood alert for the area).

Upon completion of the processing, control returns to receipt block 502. Although this figure, for simplicity, illustrates a single thread of control and processing for a single message, this is not a restriction. It is also possible to process the data using a multi-threaded control structure. Multi-threaded control may be in a single address space or a plurality of address spaces on the receiving processor. A wide range of possible transaction and event processing paradigms, common in ordinary practice, can also be applied to effect the necessary processing steps.

While the foregoing methods assume a stationary receiver, the invention is fully applicable to portable receivers such as those in vehicles. Other display and readout methods, including for example non-television CRT displays, flat panel displays of all types, or simple digital interfaces can be included. Such devices may provide only audio output as the primary form of output. Such output could be provided as part of an integrated automobile radio, as a separate audio channel, or by using local injection of RF signal to the radio receiver, and provide a means by which traffic conditions, public service alerts, and similar announcements are provided. By use of dynamic global positioning system (GPS) input information, roadside location transmitters, or preprogrammed route information, location data can be received or entered for updating a present location of the receiver. Drivers thus can be selectively targeted for specific messages relating to local conditions and conditions along their impending routes.

For vehicles, a portable geographic reporting unit, such as a Global Positioning System (GPS) unit can be supplemented with an altitude sensing unit to encode elevation data. This position sensing means is coupled to the set-top unit to provide the necessary location information. Another method is to have the information keyed in based upon grid positions and elevation contours read by the user from a map. Unlike the automated method, keyed entry of location information is subject to transcription error, and requires the availability of accurate maps and accurate location of the receiver at a point on the map.

The set-top unit includes sufficient data processing capacity to receive and process the digital broadcast information. The set-top unit can be programmed with frequently queried location information or shorthand location keys, such as the user's home or business telephone number or street address, and such location information can form a default value which the processor always monitors, in addition to any other information which the user chooses to select. The processor can match this location selection information to location designation information included in the incoming data stream or associated with the data stream, deriving latitude, longitude and preferably altitude information from the data stream.

Figure 6:
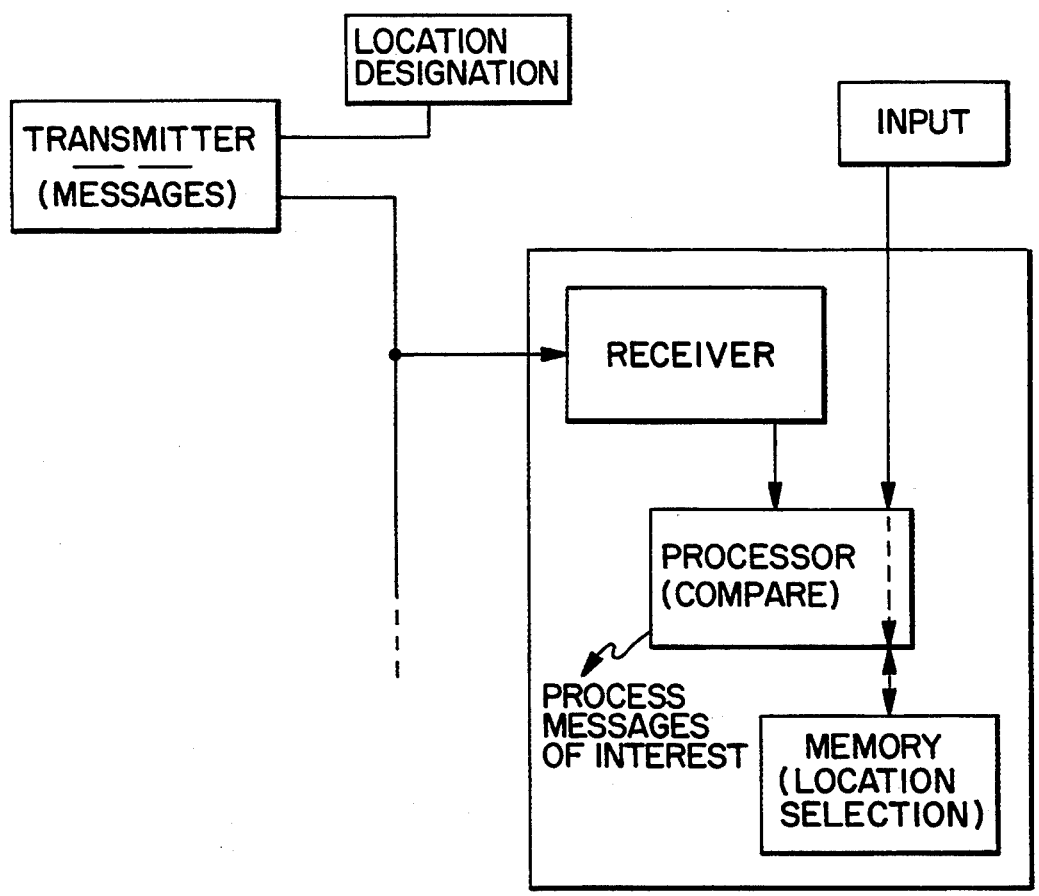
FIG. 6 is a block diagram showing the transmitter, means for inserting, receiver, memory, input means, comparing means and processing means of the invention.
Figure 7:
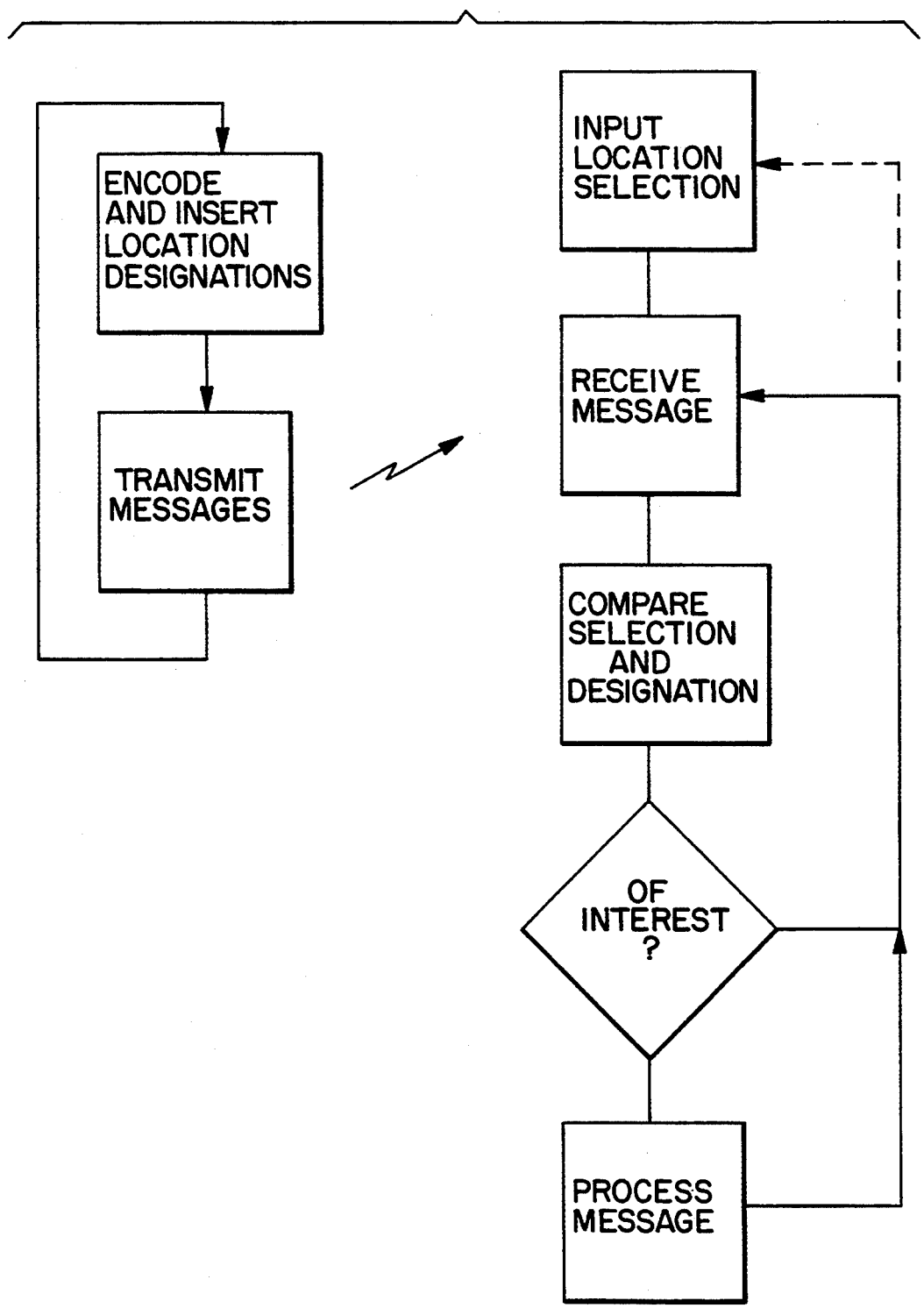
FIG. 7 is a flow diagram showing the steps of transmitting, encoding, receiving, comparing and processing of the invention.

The set-top unit should retain its location information across transient events such as power failures. A non-volatile memory is preferably included for this purpose, such as erasable programmable read-only memory (EPROM), electrically erasable PROM (EEPROM), "Flash EPROM", battery-backed memory, or the like. Battery-backed CMOS memory is a preferred non-volatile storage means. The hardware aspects of the invention are shown generally in FIG. 6, and the functional steps for practicing the invention are shown generally in FIG. 7. As shown, the system for broadcasting and receiving location specific data according to the invention includes a transmitter operable to transmit a succession of information segments containing information of potential interest to subsets of users of the general broadcast system, said transmitter being operable to broadcast generally said information segments, means for inserting a location designation code into at least one of said information segments, whereby the information segments may be associated with at least one of a designated point, area and volume, at least one receiver, operable to decode the successive information units, coupled to a memory for storing a location selection code, identifying at least one of a selected point, area and volume, wherein the receiver comprises an input means coupled to the memory for loading said location selection code, whereby the location selection code is changeable, means for comparing the location selection code and the location designation code, and for identifying an overlap, and means for processing selected ones of the information units as a function of said overlap.

The invention having been disclosed, a number of variations on the preferred embodiments disclosed as examples will now be apparent to persons skilled in the art. The invention is intended to encompass not only the preferred embodiment, but also a range of variations and equivalents in accordance with the appended claims. Reference should be made to the appended claims rather than the foregoing examples to assess the scope of the invention in which exclusive rights are claimed.

We claim:

1. A system for broadcasting and receiving location specific data comprising
a transmitter operable to transmit a succession of information segments containing information of potential interest to subsets of users of the general broadcast system, said transmitter being operable to broadcast generally said information segments;
means for inserting a variable location designation code into at least one of said information segments, whereby the information segments may be associated with at least one of a designated point, area and volume to which the variable location designation code relates;
at least one receiver, operable to decode the successive information segments including the location designation codes thereof, the receiver being coupled to a memory for storing a variable location selection code, identifying at least one of a selected point, area and volume that may overlap said at least one designated point, area and volume for respective said information segments;
wherein the receiver comprises an input means coupled to the memory for loading said location selection code, whereby the location selection code is changeable, means for comparing the location selection code loaded in the memory to the location designation code decoded from the successive information segments, and for identifying an overlap, and means for processing selected ones of the information segments as a function of said overlap.

2. The system for broadcasting and receiving location specific data according to claim 1, wherein the information segments are encoded in at least one of audio, video, digital data, subcarrier data, and data embedded in the one of said audio or video signal.

3. The system for broadcasting and receiving location specific data according to claim 2, wherein the digital data is encoded in the vertical blanking interval of a video signal.

4. The system for broadcasting and receiving location specific data according to claim 1, wherein the transmission is effected over a community cable distribution system.

5. The system for broadcasting and receiving location specific data according to claim 1, wherein the transmission is effected as an over-the-air broadcast system.

6. The system for broadcasting and receiving location specific data according to claim 1, wherein the transmission is effected over a data network.

7. The system for broadcasting and receiving location specific data according to claim 1, wherein the transmission is effected over a common carrier.

8. The system for broadcasting and receiving location specific data according to claim 1, wherein said means for inserting said location designation code in the information segments is functionally coupled to a plurality of receivers forming a subnetwork of a larger broadcast network.

9. The system for broadcasting and receiving location specific data according to claim 1, further comprising conversion means associated with at least one of the transmitter and receiver, the conversion means being operable to translate at least one of the location designation code and the location selection code between two representations of location, such that said at least one of the location designation code and the location selection code can be inserted and stored, respectively, in different formats, and converted to a same format for comparison.

10. The system for broadcasting and receiving location specific data according to claim 9, wherein said conversion means is operable to translate between absolute and relative geographic coordinates.

11. The system for broadcasting and receiving location specific data according to claim 9, further comprising a memory, wherein said conversion means is operable to translate between alternate codes and geographic coordinates.

12. The system for broadcasting and receiving location specific data according to claim 1, wherein the receiver is operationally coupleable to a position reporting device including at least one of a lateral position encoding unit and an altitude encoding unit.

13. The system for broadcasting and receiving location specific data according to claim 12, wherein the geographic reporting unit comprises at least one of a Global Positioning System unit and a Long Distance Radio Navigation System (LDRAN) unit.

14. A method for processing location specific data transmitted on a general broadcast system, comprising:
transmitting a succession of information segments containing information of potential interest to subsets of users of the general broadcast system;
transmitting at least one location designation code containing information designating at least a geographical point to which one of said information segments relates, the location designation code being variable and the information segments relating, respectively, to a plurality of different geographical points;
encoding in a data processor at least a point of interest to a user of the general broadcast system, using at least one geographical coordinate which defines at least one location selection code;
receiving the information segments at a receiver coupled to the data processor, and comparing the location selection code with the location designation code via the data processor to determine an overlap thereof, the overlap identifying at least one particular information segment from the succession of information segments as an information segment of interest; and,
processing the information segment of interest for presentation to the user.

15. The method for processing location specific data according to claim 14, comprising representing at least one of the location designation code and the location selection code by an alternate code representing a location.

16. The method for processing location specific data according to claim 15, further comprising including in said alternate code at least one of a street address, a telephone number, a postal code, a block designation, a political subdivision and an informal geographic subdivision.

17. The method for processing location specific data according to claim 16, wherein at least one of the location selection code and the location designation code specifies a region having an area, and determining said overlap by at least a part of the other of said at least one of the location selection code and the location designation code falling in the region.

18. The method for processing location specific data according to claim 14, further comprising accepting input from the user to the data processor for at least partly defining the location selection code, whereby the location selection code is variable.

19. The method for processing location specific data according to claim 14, further comprising filtering the information segment and rejecting information segments which are not of interest.

20. The method for processing location specific data according to claim 14, comprising at least one of preferentially storing and preferentially displaying to the user the information segment as a function of a relationship between the location designation code and the location selection code.

21. The method for processing location specific data according to claim 14, comprising transmitting the location designation code to align with the information segments in real time, and further comprising said receiving, comparing and processing of the information segment in real time.

22. The method for processing location specific data according to claim 14, comprising transmitting the location designation code for an information segment prior to transmission of the information segment to which the location designation code refers, and referencing the information segment to the location designation code when receiving, comparing and processing the information segment.

23. The method for processing location specific data according to claim 14, comprising defining more than one location of interest for at least one of the location designation code and the location selection code.

24. The method for processing location specific data according to claim 14, comprising at least partly defining at least one of the location designation code and the location selection code as a border of a region.

25. The method for processing location specific data according to claim 24, wherein the at least one of the location designation code and the location selection code defines a plurality of borders bounding the respective region.

26. The method for processing location specific data according to claim 14, wherein each of the information segments has an individual location designation code.

27. The method for processing location specific data according to claim 14, wherein the location selection code identifies a plurality of locations, and further comprising prioritizing processing of information segments based upon a function of a relationship between the location designation code and the location selection code, for preferentially processing information segments referring to at least one of said locations over others of said locations.

28. The method for processing location specific data according to claim 14, wherein the at least one information segment represents a localized hazard warning.

29. The method for processing location specific data according to claim 14, wherein the at least one information segment represents a localized offer of an opportunity.

30. A method for processing location specific data transmitted on a general broadcast system, comprising:
transmitting a succession of information segments containing information of potential interest to subsets of users of the general broadcast system;
transmitting at least one location designation code containing information designating at least a geographical point to which one of said information segments relates;
encoding in a data processor at least a point of interest to a user of the general broadcast system, using at least one geographical coordinate which defines at least one location selection code;
receiving the information segments at a receiver coupled to the data processor, and comparing the location selection code with the location designation code via the data processor to determine an overlap thereof defining at least one particular information segment as an information segment of interest; and, processing the information segment of interest for presentation to the user; and, employing an identification of lateral position and elevation for at least one of the location designation code and the location selection code.

31. A method for processing location specific data transmitted on a general broadcast system, comprising:

transmitting a succession of information segments containing information of potential interest to subsets of users of the general broadcast system;

transmitting at least one location designation code containing information designating at least a geographical point to which one of said information segments relates;

encoding in a data processor at least a point of interest to a user of the general broadcast system, using at least one geographical coordinate which defines at least one location selection code;

receiving the information segments at a receiver coupled to the data processor, and comparing the location selection code with the location designation code via the data processor to determine an overlap thereof defining at least one particular information segment as an information segment of interest; and, processing the information segment of interest for presentation to the user; and, operating a position reporting device at least temporarily to determine a code representing a location of the user, and entering said code into the data processor to at least partly define said location selection code.

32. The method for processing location specific data according to claim 31, wherein the position reporting device comprises at least one of a geographic reporting unit operable to determine longitude and latitude, and an altitude sensing unit operable to determine elevation.

33. The method for processing location specific data according to claim 32, wherein the altitude sensing unit comprises a barometer for providing an air pressure reading to the input means, and further comprising transmitting a normalized ambient pressure in at least one of said information segments, and converting said air pressure reading to an elevation as a function of said air pressure reading and said normalized ambient pressure.

34. The method for processing location specific data according to claim 32, wherein the geographic reporting unit comprises at least one of a Global Positioning System unit and a Long Distance Radio Navigation System (LDRAN) unit.

35. The method for processing location specific data according to claim 31, wherein the receiver is movable and further comprising sensing the location of the user at least intermittently to at least partly define a varying location selection code.

36. An apparatus for location specific processing of generally broadcast data, the data including successive information units containing respective location designation codes that are variable among the successive information units, comprising:

means for receiving successive information units, coupled to a memory operable to store a location selection code;

an input means coupled to the memory for loading said location selection code;

means for comparing the location selection code from the input means with the location designation codes of the successive information units as received by said means for receiving, and identifying an overlap;

means for processing selected ones of the information units as a function of said overlap.

37. The apparatus according to claim 36, wherein the input means includes switch means for manual operation by a user.

38. The apparatus according to claim 36, wherein the input means comprises an automatic location sensor.

39. The apparatus according to claim 38 wherein the automatic location sensor is associated with a mobile unit, and is operable to update said location selection code.

40. The apparatus according to claim 36, wherein the input means is coupleable to a position reporting device comprising at least one of a geographic reporting unit operable to determine longitude and latitude, and an altitude sensing unit operable to determine elevation.

41. The apparatus according to claim 40, wherein the geographic reporting unit comprises at least one of a Global Positioning System unit and a Long Distance Radio Navigation System (LDRAN) unit.

42. The apparatus according to claim 36, further comprising conversion means being operable to translate at least one of the location designation code and the selection code between two representations of location, whereby the location designation code and the selection code are compared after conversion using a same format.

43. The apparatus according to claim 42, wherein said conversion means is operable to translate between absolute and relative geographic coordinates.

44. The apparatus according to claim 42, further comprising a memory, wherein said conversion means is operable to translate between alternate codes and geographic coordinates.

* * * * *

US005432542C1

(12) EX PARTE REEXAMINATION CERTIFICATE (9107th)
United States Patent
Thibadeau et al.

(10) Number: US 5,432,542 C1
(45) Certificate Issued: Jul. 3, 2012

(54) TELEVISION RECEIVER LOCATION IDENTIFICATION

(75) Inventors: Robert Thibadeau, Pittsburgh, PA (US); Joseph M. Newcomer, Pittsburgh, PA (US); David Touretzky, Pittsburgh, PA (US)

(73) Assignee: Ambato Media, LLC, Wilmington, DE (US)

Reexamination Request:
No. 90/011,516, Feb. 28, 2011

Reexamination Certificate for:
Patent No.: 5,432,542
Issued: Jul. 11, 1995
Appl. No.: 07/937,641
Filed: Aug. 31, 1992

(51) Int. Cl.
*H04N 7/16* (2006.01)

(52) U.S. Cl. .................................. 348/6; 348/9; 455/4.2
(58) Field of Classification Search ........................ None
See application file for complete search history.

(56) References Cited

To view the complete listing of prior art documents cited during the proceeding for Reexamination Control Number 90/011,516, please refer to the USPTO's public Patent Application Information Retrieval (PAIR) system under the Display References tab.

*Primary Examiner* — Karin M. Reichle

(57) ABSTRACT

Location specific messages or programming are generally broadcast and selectively filtered by user terminals which have encoded one or more arbitrary locations of interest. The area surrounding a user, a remote location, a route to be travelled or the like may be selected for receipt of local warnings, local commercial messages and the like. Transmitted message contain information targeted to geographical groups of users, with location designation coding accompanying location-specific messages. A geographic location selection code is entered into a data processor coupled to the user's receiver to define the user's selected location(s) of interest. The processor receives the information segment and its designation code and compares the designated location to the selected one. Segments where the designated and selected points or areas overlap are processed, e.g., being displayed, stored or used to trigger a warning. The user's selection code is variable and plural locations can be used and prioritized. Preferably, regions are encoded by their boundaries, e.g., in longitude, latitude, altitude or the like, and in absolute or relative coordinates, and shorthand designations can refer to stored definitions of areas. Filtering segments based on message content, prioritizing the messages and additional features can be included. The system is especially useful for disturbing local commercial messages, hazard warning or the like.

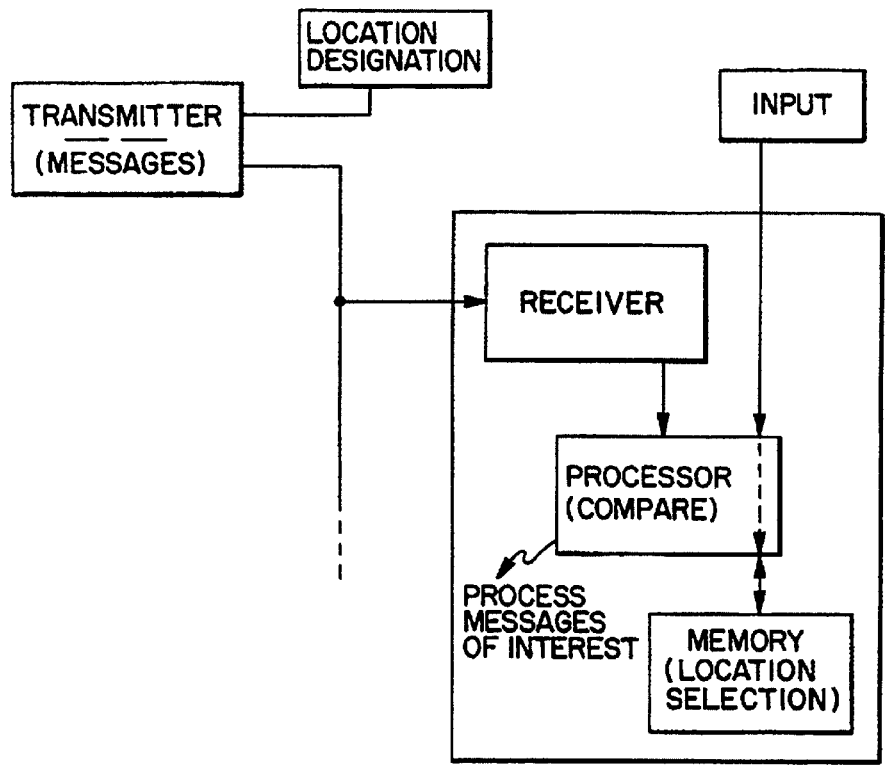

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 36 and 38-39 is confirmed.

New claims 45-47 are added and determined to be patentable.

Claims 1-35, 37 and 40-44 were not reexamined.

*45. The apparatus according to claim 36, wherein the input means comprises an automatic location sensor such that the location selection code designates a geographic area encompassing a geographic location obtained from the automatic location sensor, and the means for comparing the location selection code from the input means with the location designation codes of the successive information units as received by said means for receiving, and identifying an overlap is configured to, for each information unit of the successive information units:*

*directly compare the geographic area designated by the location selection code and a geographic area designated by the location designation code of the information unit.*

*46. The apparatus according to claim 36, wherein the input means comprises an automatic location sensor such that the location selection code designates a geographic area encompassing a geographic location obtained from the automatic location sensor, and the means for comparing the location selection code from the input means with the location designation codes of the successive information units as received by said means for receiving, and identifying an overlap is configured to, for each information unit of the successive information units:*

*directly compare the geographic area designated by the location selection code and a geographic area designated by the location designation code of the information unit.*

*47. The apparatus according to claim 36, wherein the input means comprises an automatic location sensor such that the location selection code designates a geographic location obtained from the automatic location sensor, and the means for comparing the location selection code from the input means with the location designation codes of the successive information units as received by said means for receiving, and identifying an overlap is configured to, for each information unit of the successive information units:*

*directly compare the geographic location designated by the location selection code and a geographic area designated by the location designation code of the information unit.*

\* \* \* \* \*